Aug. 1, 1933.          E. TIMBS                1,920,610
STEEL HOSE JOINT
Filed Nov. 3, 1930

Inventor
Edward Timbs
By Lyon & Lyon
Attorneys

Patented Aug. 1, 1933

1,920,610

UNITED STATES PATENT OFFICE 1,920,610

STEEL HOSE JOINT

Edward Timbs, Los Angeles, Calif., assignor to The National Supply Company, Toledo, Ohio, a Corporation of Ohio Application November 3, 1930. Serial No. 493,061

3 Claims. (Cl. 285—96)

This invention relates to steel hose joints and is more particularly addressed to the provision of a steel hose joint which is freely flexible under working pressure, and one that is not limited to the amount of flexibility.

Another object of this invention is to provide a steel hose joint which includes a simple means for packing the joint and which is so constructed as to make easy access to the packing without necessitating the removal of the hose from the working position.

Another object of this invention is to provide a steel hose joint including a long, wide construction in which there is provided a fluid chamber for handling fluids of abrasive character under high pressure to minimize the possibility of the turbulent flow of the abrasive fluid under pressure while passing through such steel hose joint.

Other objects and advantages of this invention it is believed will be apparent from the following detailed description of a preferred embodiment thereof as illustrated in the accompanying drawing:

Figure 1:
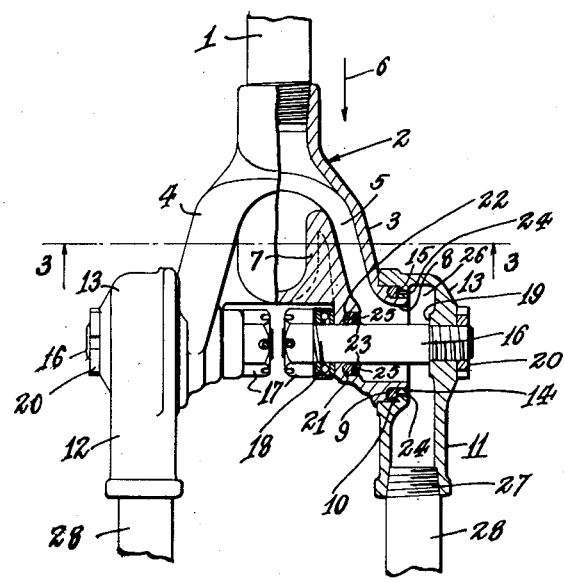
Figure 1 is an elevation partly in mid-section of a steel hose joint embodying this invention.
Figure 2:
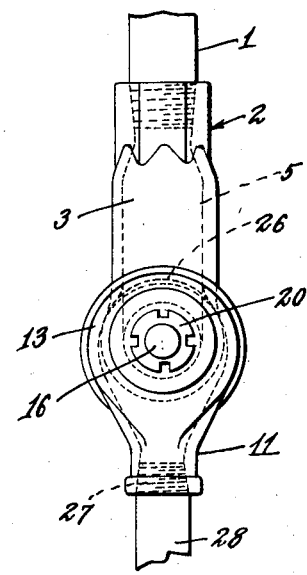
Figure 2 is a side elevation thereof.
Figure 3:
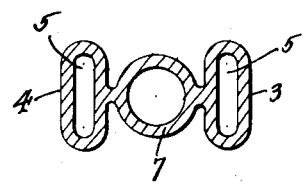
Figure 3 is a section taken substantially on the line 3—3 of Figure 1.

In the preferred embodiment of my invention illustrated in the accompanying drawing, 1 indicates a pipe or section of a steel hose to which there is threaded a connecting member 2. The connecting member 2 is provided with two spaced branches 3 and 4 forming a Y. Passages 5 formed through the branches 3 and 4 of the connecting member 2 combined have a cross-sectional area in excess of the cross-sectional area of the pipe 1 permitting a substantially unrestricted flow of fluid through the connecting member.

As the steel hose connecting member or joint embodying my invention is primarily designed for the purpose of handling abrasive fluids such, for example, as rotary well drilling mud and which mud is passed through such a steel hose under relatively high pressure, I have found it desirable to provide a means in such a coupling member for reducing to a minimum the turbulence of flow of such abrasive fluid under high pressure as it is passing through the steel hose. In order to minimize the turbulence of flow through the connecting member or joint as the fluid is passing through in the direction of arrow 6, I form the coupling member 2 with an inverted dome 7 which is cast integral with the coupling member 2 and provides a fluid chamber in the coupling member 2.

The ends of the branches 3 and 4 are provided with transversely extending annular flanges 8. The annular flanges are provided with cupped annular shoulders 9 into which a cup packing 10 is mounted around the periphery of the flanges 8. Swivelled to the branches 3 and 4 are spaced coupling members 11 and 12. The coupling members 11 and 12 are provided with substantially cylindrical heads 13 provided on their inner periphery with inwardly extending annular packing flanges 14 which extend inwardly to provide packing shoulders 15 which retain a packing 10 on the cupped shoulders 9.

The annular flanges 8 fit within the cylindrical heads 13 of the coupling members 11 and 12 and are retained in position by means of transversely extending swivel bolts 16 which extend axially through the annular flanges 8 and the circular head 13. The bolts are provided on their inner ends with nuts 17 which are screw-threaded to the bolts 16. The outer ends of the bolt 16 are shouldered as indicated at 19 and are secured to the circular heads 13 by the shoulders 19 and nuts 20. An anti-friction ball thrust bearing 18 is provided between the nuts 17 and the branches 3 and 4 for the purpose of permitting the free swiveling of the joint when under pressure.

Formed within the branches 3 and 4 around the bolts 16 are cupped packing grooves 21 into which cupped packing 22 is mounted. Packing followers 23 are positioned over the cupped packing grooves in position to retain the packing 22 in position.

In order to provide for the expansion of the packing 10 and the packing 22 by the pressure of the fluid passing through the joint, the flange 14 is ported at a plurality of points around the packing 10 as indicated at 24, and the packing follower 23 is ported at a plurality of points around the packing 22 as indicated at 25. Ports 24 and 25 are in open communication at their outer ends with the passage 26 of the coupling members 11 and 12 and with the passage 5 formed through the branches 3 and 4.

The outer ends of the coupling members 11 and 12 are threaded as indicated at 27 to receive connecting pipes 28. The two pipes 27 are connected together in any suitable manner such, for example, as by means of a pair of elbows and a connecting T and nipples, not shown, but well understood in the art, so that the branches 11 and 12 of the joint may be connected with the steel hose. It is not deemed necessary to specifically illustrate the points described in this kind of connection as it is well understood in the art.

An important feature of my invention lies in the means provided for the adjustment of the packing utilized for making a fluid-tight joint whether the packing be of the cup type illustrated at 10 and 22 or of some other form. The bolts 16 and nuts 17 provide means for independently adjusting the packing for each of the branches 4 and 5 and are in positions easily accessible so that these adjustments may be readily made without interfering with the operation of the joint.

Having fully described my invention, it is to be understood that I do not wish to be limited to the details herein set forth, but my invention is of the full scope of the appended claims.

I claim:

1. In a device of the class described, the combination of a coupling member providing a pair of spaced branches, a pair of coupling members adapted for connection to said branches, the said coupling members providing a path through the device for the flow of fluid, means for pivotally connecting the second said coupling members to said branches, the last said means including bolts extending transversely of the path of flow of fluid through said device, packing between each branch and its coupled member, and means adjusting said bolts to independently adjust said packing for each branch.

2. In a device of the class described, the combination of a coupling member having a pair of spaced branches, a coupling member for each branch, transversely extending pivot bolts for pivotally connecting each branch with its corresponding coupling member, packing between said branches and said coupling members, and means for adjusting said bolts to independently adjust said packings.

3. In a device of the class described, the combination of a coupling member having a pair of spaced branches, a coupling member for each branch, transversely extending pivots for pivotally connecting each branch with its corresponding coupling member, anti-friction means interposed between each pivot post and each branch, packing between said branches and said coupling member, and means for adjusting said bolts to independently adjust the end play between the complementary coupling members.

EDWARD TIMBS.